US005317911A

United States Patent [19]

Yaraschefski

[11] Patent Number: 5,317,911

[45] Date of Patent: Jun. 7, 1994

[54] FIXTURE FOR TORQUING COMPONENTS OF AN ASSEMBLY

[76] Inventor: Steven M. Yaraschefski, 4660 N. 500 West, Bargersville, Ind. 46106

[21] Appl. No.: 851,928

[22] Filed: Mar. 16, 1992

[51] Int. Cl.[5] ...................... G01N 15/00; F02M 65/00

[52] U.S. Cl. ................................ 73/119 A; 29/888.01

[58] Field of Search ........... 73/119 A, 862.21, 862.26; 29/469, 888.01

[56] References Cited

U.S. PATENT DOCUMENTS

| | | | |
|---|---|---|---|
| 812,042 | 2/1906 | Hudson | 33/501.02 |
| 2,263,803 | 11/1941 | Graham | 73/119 A |
| 2,366,645 | 1/1945 | Ollendorff | 128/651 |
| 2,449,137 | 9/1948 | Petersen | 73/119 A |
| 2,517,766 | 8/1950 | Cole | 73/119 A |
| 2,642,047 | 6/1953 | Johnson | 73/119 A |
| 2,857,759 | 10/1958 | Kiene | 73/119 A |
| 3,026,723 | 3/1962 | Cief | 73/119 A |
| 3,307,266 | 3/1967 | Miserocchi | 33/172 |
| 4,109,518 | 8/1978 | Dooley et al. | 73/119 A |
| 4,170,072 | 10/1979 | Downs | 33/172 R |
| 4,435,128 | 3/1984 | Frey et al. | 73/119 A |
| 4,455,868 | 6/1984 | Kampichler | 73/119 A |
| 4,510,796 | 4/1985 | Kampichler | 73/119 A |
| 4,620,352 | 11/1986 | Sulej | 29/251 |
| 4,829,646 | 5/1989 | Cigolotti et al. | 73/119 A |
| 4,901,700 | 2/1990 | Knight et al. | 123/470 |
| 5,109,706 | 5/1992 | Mogilnicki | 73/862.21 |

*Primary Examiner*—Hezron E. Williams
*Assistant Examiner*—George Dombroske
*Attorney, Agent, or Firm*—Woodard, Emhardt, Naughton, Moriarty & McNett

[57] ABSTRACT

A diesel fuel injector fixture is disclosed for torquing a solenoid valve within a diesel fuel injector body. The fixture includes a hydraulic ram for partially clamping the solenoid valve to the injector body and a nesting fixture for locating the fuel injector relative to the hydraulic ram. An adjustable stop assembly on the torquing fixture adjusts to the orientation of a torque wrench engaged with the solenoid valve and locks in place to provide stops for the torque wrench. The torque wrench rotates between the stops to apply a predetermined final torque to the solenoid valve, wherein the combination of the hydraulic clamp load and the predetermined final torque properly seat the solenoid valve in the injector body.

15 Claims, 13 Drawing Sheets

FIXTURE FOR TORQUING COMPONENTS OF AN ASSEMBLY

BACKGROUND OF THE INVENTION

This invention relates generally to fixtures and more specifically to a fixture used for torquing a component of a fuel injector assembly.

Prior mechanical fuel delivery systems have provided improved power and efficiency for internal combustion engines. Recently, electronic technology has replaced the mechanical technology in fuel delivery systems to further improve the efficiency and operational characteristics of an internal combustion engine. However, as sophisticated electronic technology is increasingly incorporated in fuel delivery systems, field repair and maintainability of these systems have declined. As a result, fixtures for repairing fuel delivery system components have been required to match factory provided levels of efficiency and operational characteristics.

One example of such a component is the fuel injector for a diesel engine. Because diesel engines typically operate for more than five hundred thousand miles between major overhauls, field repair of diesel fuel injectors between overhauls is desirable to maintain factory provided levels of fuel metering. This is particularly true for diesel engines in the trucking industry which rely on high levels of fuel efficiency to keep operating costs at a minimum. Nozzle testers for diesel engines have been developed dating back to 1945. For example, U.S. Pat. No. 2,157,766 by Cole describes such a nozzle tester. Kiene, U.S. Pat. No. 2,857,759, discloses a diesel engine fuel injector testing device which mounts the fuel injector in a vertical position on a frame. In Kiene, the plunger, check valve, tip seal, or any test requiring oil pressure force through the injector, may be tested. Downs, U.S. Pat. No. 4,170,072, discloses a fuel injector adjustment fixture which permits the adjustment of a stop which limits the upward travel of a unit type fuel injector plunger.

While these devices address generally fixtures for fuel injectors of diesel engines, there is always a need for an improved fixture capable of repeating factory set assembly tolerances while being used in the field. Such a fixture should therefore be operable by the average diesel mechanic and provide assembly limits or checks to prevent damaging the fuel injector components. Such a fixture should also be self-contained and readily transportable to facilitate transport within the operating field. Such a fixture would further be adaptable for torquing components of the Cummins CELECT TM electronically controlled injectors for the full authority electronic fuel system of both the Cummins L10 and N14 model diesel engines.

SUMMARY OF THE INVENTION

A torquing fixture is disclosed for torquing a component of a fuel injector assembly. The fixture includes a frame and means for locating a fuel injector assembly relative to the frame. A guide rail is mounted to the frame, and a stop assembly is slidably mounted to the guide rail. The stop assembly includes a first stop, a second stop and means for connecting the first stop to the second stop, wherein the connecting means maintains the first stop at a predetermined distance from the second stop. Also provided are means for releasably locking the stop assembly to the guide rail and a first wrench adapted for torquing the fuel injector component. The first wrench has a head end for engaging the fuel injector component and an elongated handle attached to the head end.

A nesting fixture is provided as means for locating the fuel injector assembly relative to the frame. The nesting fixture includes a base and a center block fastened to the base, wherein the center block includes a locating bore for receiving a portion of the fuel injector assembly therein. A first support block is fastened to the center block and includes a first pin for contacting the fuel injector assembly. A second support block is fastened to the center block across from the first support block and includes a second pin for contacting the fuel injector assembly. The first and second pins locate the fuel injector assembly therebetween. An extension block is fastened to the base and includes an arm mounted thereto, wherein the arm includes an adjustable clamp for clamping the fuel injector assembly to the center block.

A method for torquing a component of a fuel injector assembly is also disclosed, comprising the steps of locating a fuel injector assembly relative to the torquing fixture, applying a clamp load to the fuel injector assembly, engaging the first wrench with the fuel injector component, sliding the stop assembly on the guide rail to contact the first stop with the handle of the first wrench, locking the stop assembly to the guide rail, and rotating the elongated handle of the first wrench from the first stop to the second stop to apply a predetermined torque to the fuel injector component.

One object of the present invention is to provide an improved fixture capable of repeating factory set assembly tolerances.

Another object of the present invention is to provide a fixture usable in the field and operable by the average diesel mechanic.

Another object of the present invention is to provide a fixture incorporating checks and limits to properly assemble a diesel fuel injector.

Another object of the present invention is to provide a fixture which is self-contained and readily transportable within the operating field.

Another object of the present invention is to provide a fixture which is adaptable for torquing components of the TM electronically controlled injectors for the full authority electronic fuel system of both the Cummins L10 and N14 model diesel engines.

Related objects and advantages of the present invention will become apparent from the following description.

DESCRIPTION OF THE PREFERRED EMBODIMENT

Figure 1:
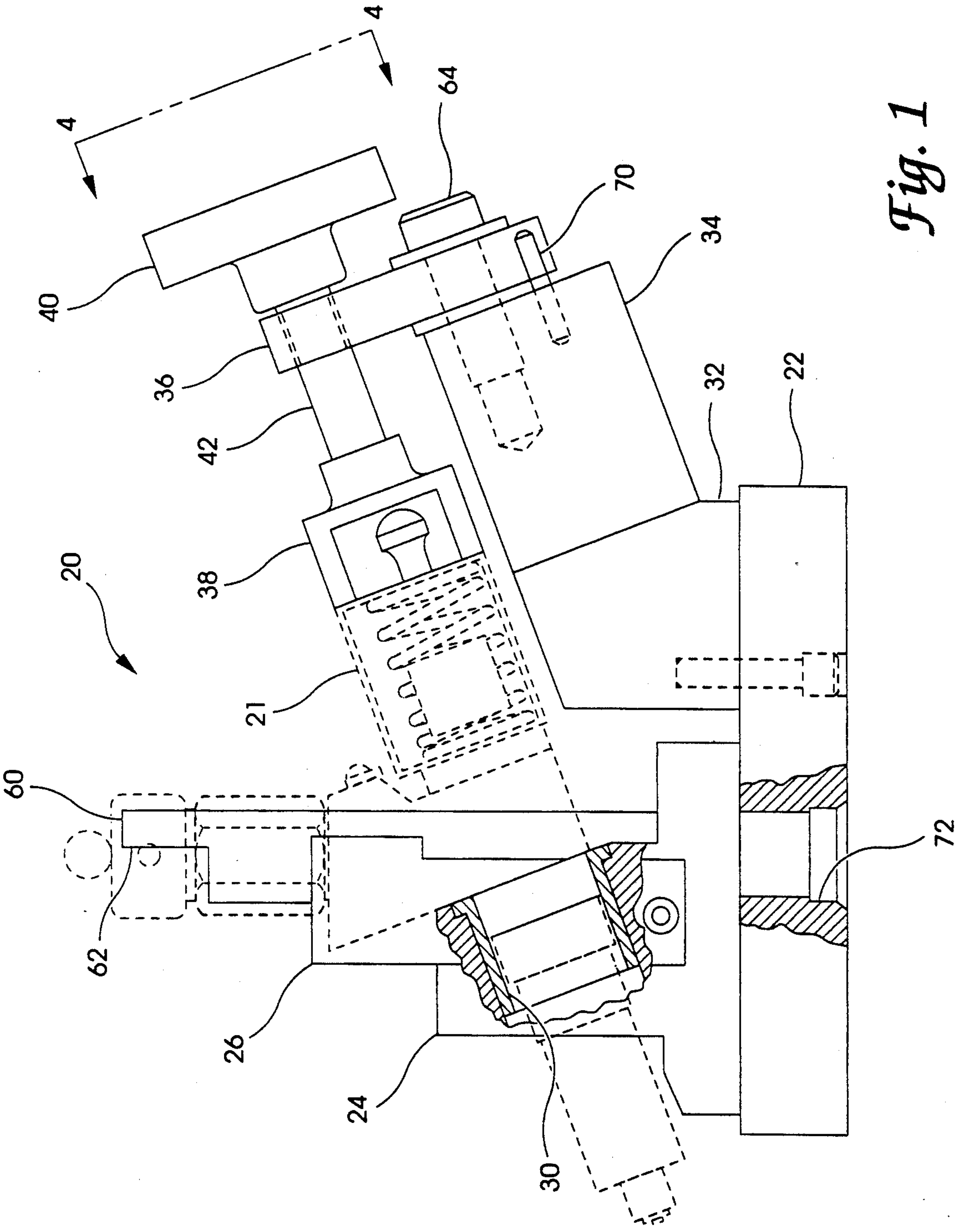
FIG. 1 is a front elevational partial cross-sectional view of a nesting fixture for a Cummins engine model N14 fuel injector assembly according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1A:
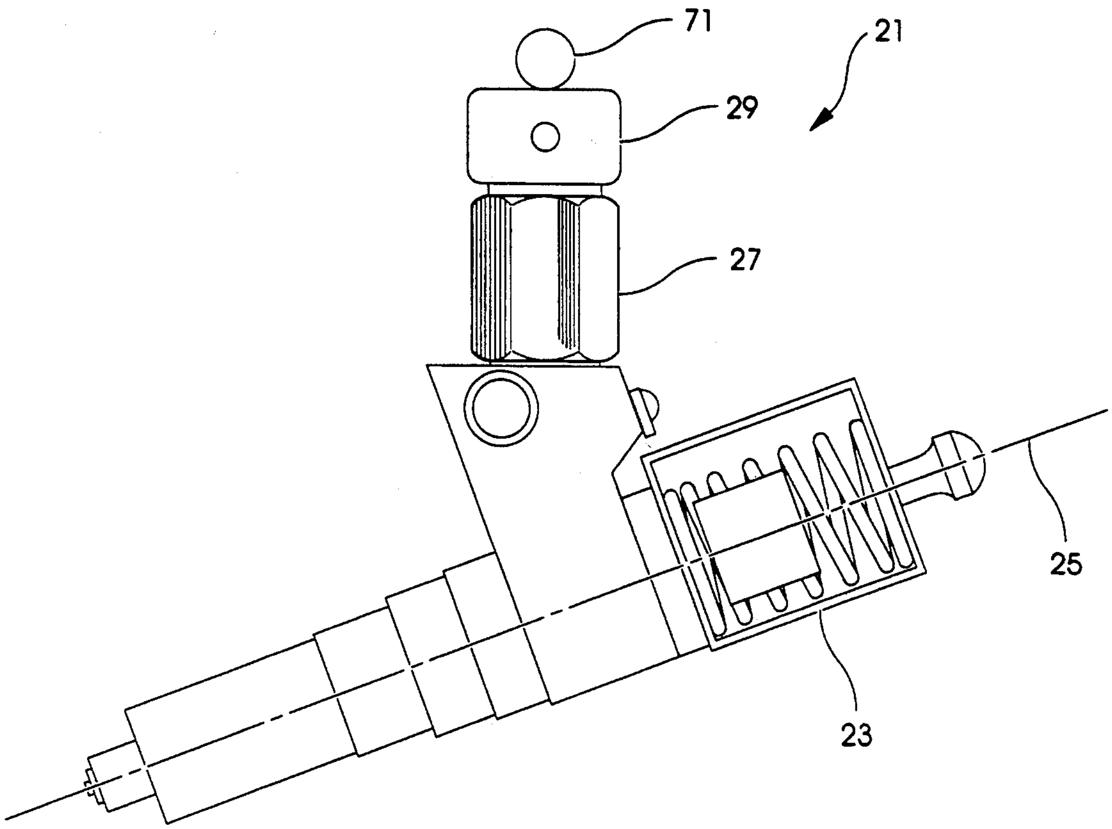
FIG. 1*a* is a front elevational view of a Cummins engine model N14 fuel injector assembly.
Figure 12:
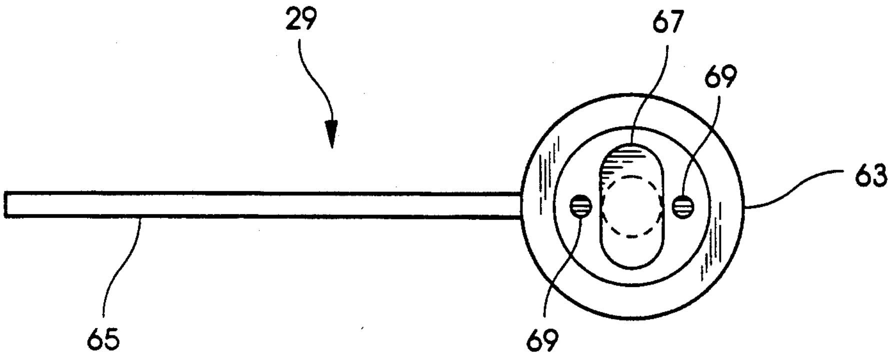
FIG. 12 is a top plan view of a stator alignment wrench adapted to the injector assembly of FIG. 1*a*.

Referring now to FIGS. 1 and 1*a*, a nesting fixture 20 is shown adapted for receiving a Cummins engine model N14 injector assembly therein. Injector assembly 21 includes a main body portion 23 having a longitudinal axis 25. Solenoid valve 27 is threaded into main body portion 23 and is shown having a stator alignment tool 29 (FIG. 12) mounted thereon for aligning the solenoid valve relative to the injector assembly. Nesting fixture 20 permits the breakdown and reassembly of the solenoid valve from the injector assembly without disturbing the remaining injector assembly. As such, overhaul time for the injector is reduced by approximately 25 to 50 minutes, should only the solenoid valve require replacement. Furthermore, needless disassembly and its inherent risk of damage to the fragile injector components is reduced.

Nesting fixture 20 includes a base 22 for removably attaching the various fixture components of nesting fixture 20 thereto. As such, all of the nesting fixture components can be easily replaced without destroying nesting fixture 20. Nesting fixture 20 supports the injector assembly via a center block 24 and support blocks 26 and 28. Center block 24 includes a brass liner 30 for receiving the injector assembly without marring or otherwise damaging any of its critical surfaces and associated surface finishes. Liner 30 is easily replaceable within center block 24 so that a smooth surface may be maintained for contacting the injector assembly. Also attached to base 22 is a swivel handle support block 32 and extension 34. The support block and extension receive a pivotable arm 36 rotatably mounted thereto. Mounted on arm 36 is a shoe clamp assembly including an adaptor 38 connected to a handle 40 by a shaft 42. Adapter 38 is constructed of steel; however, a plastic adapter is also contemplated to reduce the risk of damage to the injector assembly if the shoe clamp is tightened excessively. The shoe clamp fixes the fuel injector assembly against movement in the direction along longitudinal axis 25.

Figure 2:
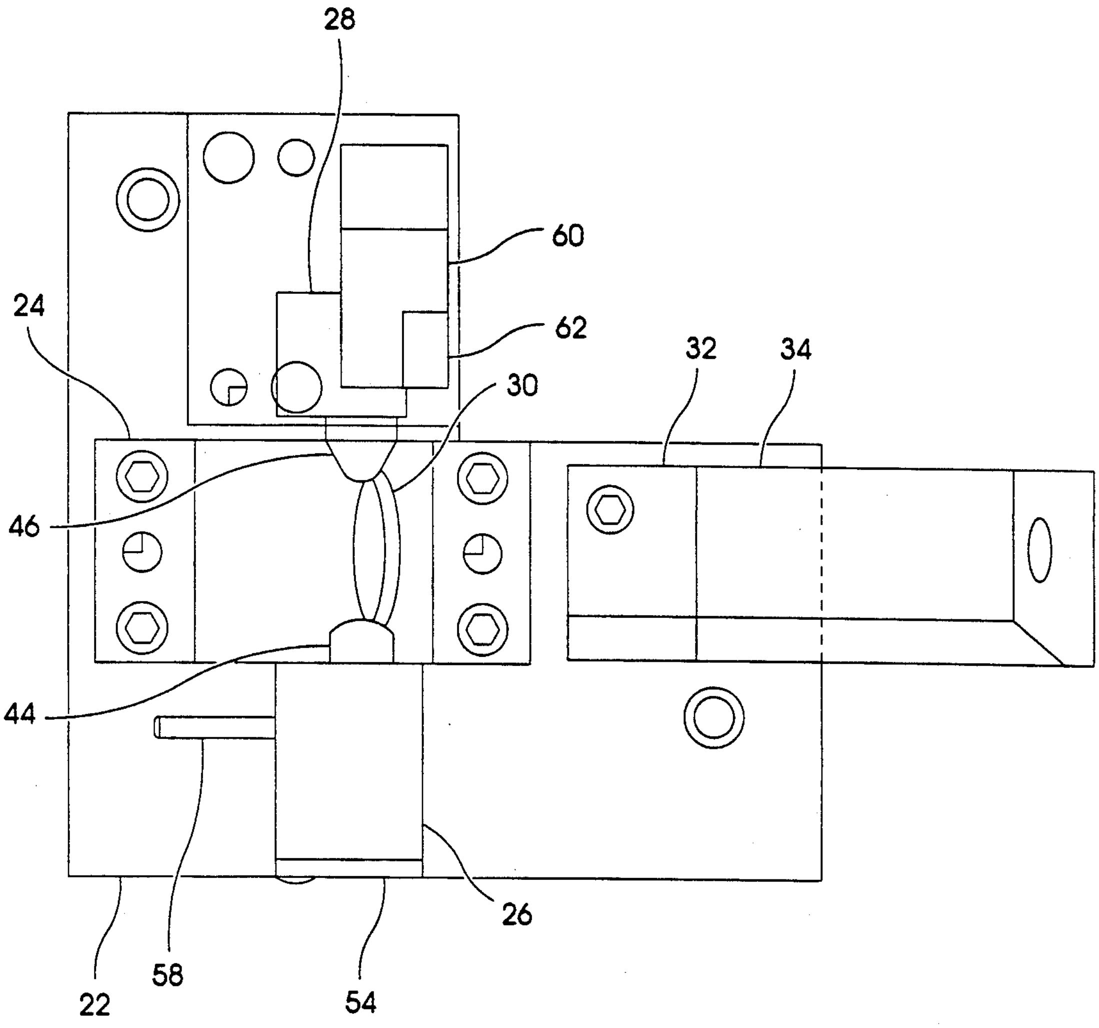
FIG. 2 is a top plan view of the nesting fixture of FIG. 1.
Figure 3:
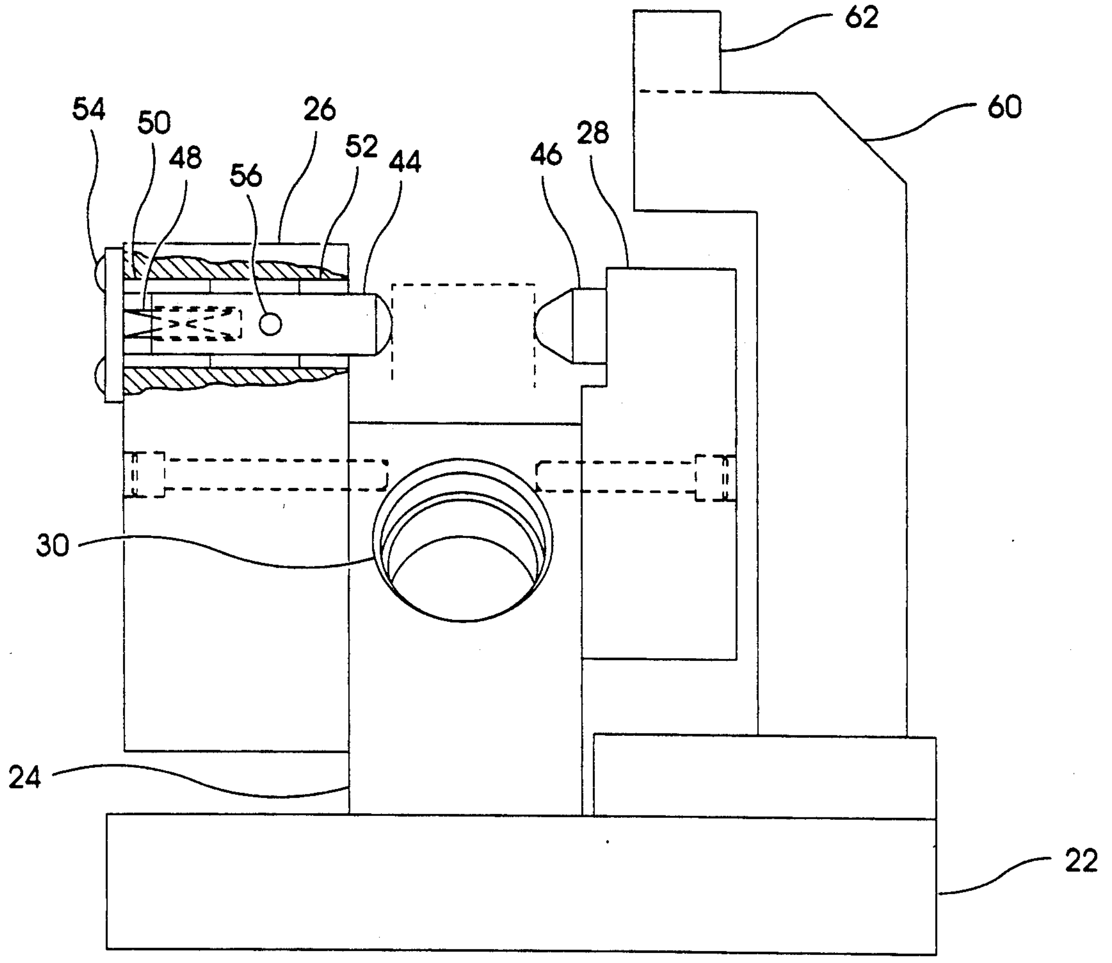
FIG. 3 is a right side elevational view of the nesting fixture of FIG. 1.

Referring now also to FIGS. 2 and 3, locating pins 44 and 46 are provided for locating the injector assembly therebetween. Pin 46 is fixed within support block 28 for contacting a side of the injector assembly. Pin 44 is slidably mounted in support block 26 and outwardly biased towards pin 44 by a spring 48. Pin 44 reciprocates on bushings 50 and 52 within the support block 26. A cover 54 provides access to spring 48 and pin 44. Pin 44 includes a locating hole 56 for receiving a dowel 58 therethrough to lock the pin in place relative to support block 26 after the fuel injector is placed in the nesting fixture. Pins 44 and 46 fix the fuel injector assembly against rotation about longitudinal axis 25.

Referring now to FIG. 1 and 3, a locator block 60 includes a stop 62 to limit the travel of a wrench handle when aligning the solenoid valve with the injector body. For example, in FIG. 12 a stator alignment wrench 29 is shown adapted for aligning the solenoid valve 27 relative to the injector assembly 21. Wrench 29 includes a head end 63 for engaging the solenoid valve and a handle 65 attached to the head end. Head end 63 includes alignment slot 67 and alignment holes 69 to orient the wrench relative to injector assembly 21.

Figure 4:
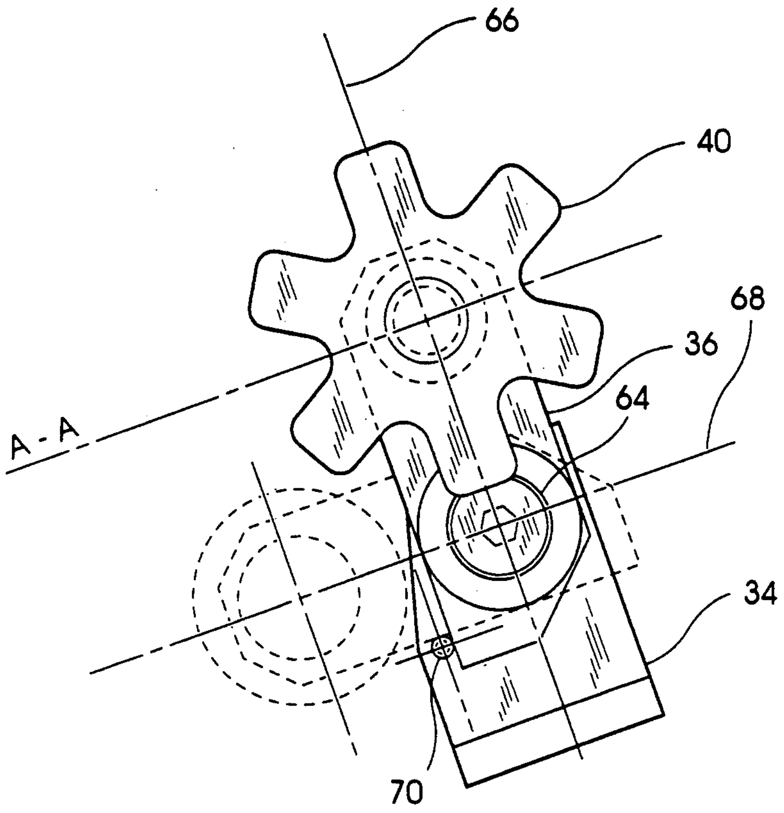
FIG. 4 is a projected view of a shoe clamp taken in the direction of the arrows 4—4 of the nesting fixture of FIG. 1.

Referring now to FIG. 1 and 4, arm 36 is rotatably mounted to extension 34 of support 32 by fastener 64. Arm 36 pivots from a first position defined by axis 66 to a second position defined by axis 68. A dowel pin 70 provides stop means for limiting the range of motion of arm 36. When positioned along axis 66 and over the injector assembly, handle 40 is rotated to advance adaptor 38 into contact with the injector assembly so as to seat and clamp the injector assembly within bushing 30 of center block 24.

Figure 5:
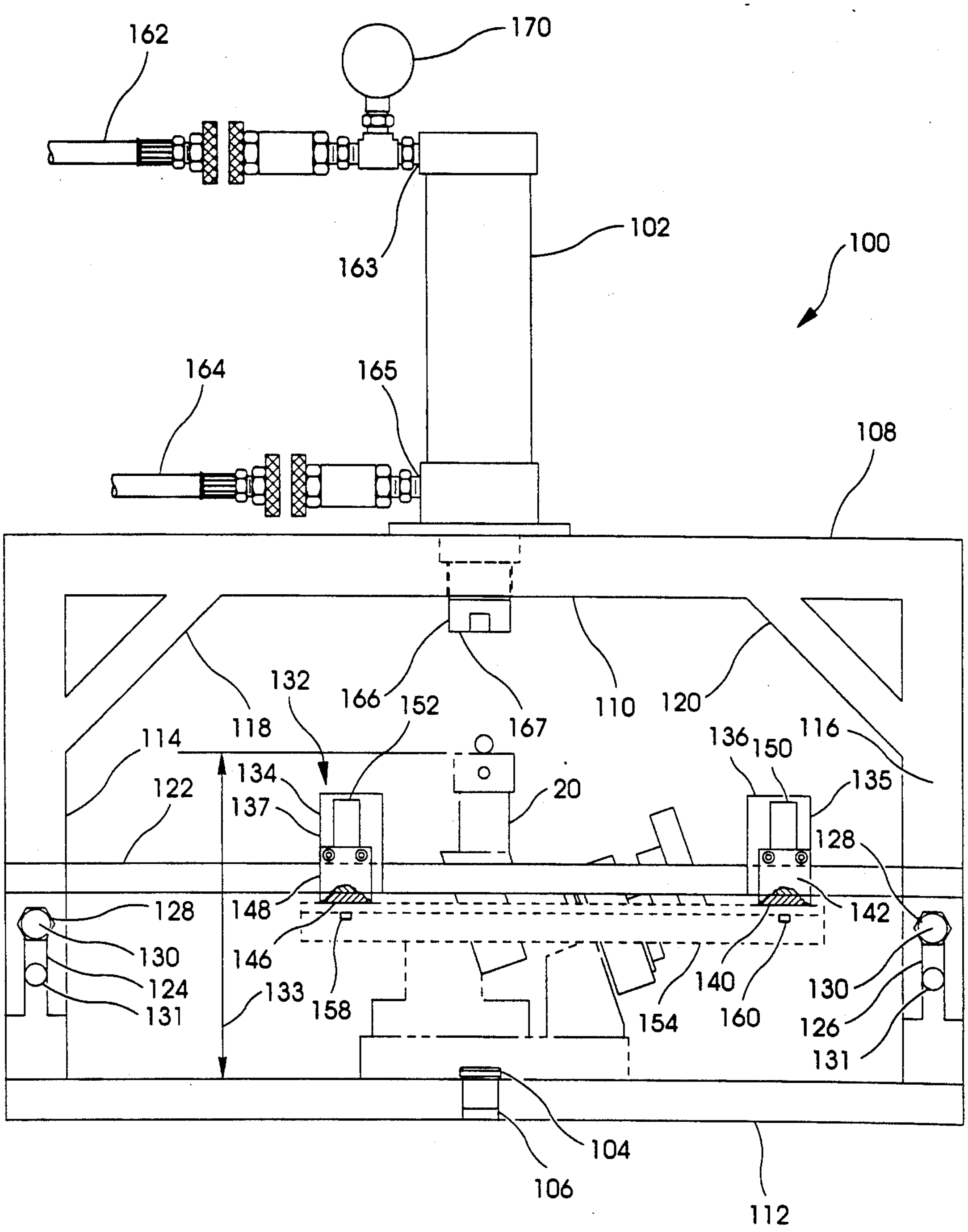
FIG. 5 is a front elevational view of a torquing fixture according to another embodiment of the present invention.

Referring now to FIG. 5, a further embodiment is illustrated which includes nesting fixture 20 shown received within a torquing fixture 100. Torquing fixture 100 includes a hydraulic ram 102 for applying an axial clamp load to the solenoid valve of the injector assembly. Referring back to FIG. 1, nesting fixture 20 includes a locating hole 72 for receiving a locating pin 104 (FIG. 5) therein. Torquing fixture 100 includes a corresponding locating hole 106 for receiving pin 104, wherein pin 104 and locating holes 72 and 106 locate the nesting fixture relative to the torquing fixture to align hydraulic ram 102 with the solenoid valve of the injector assembly.

Torquing fixture 100 includes a welded frame 108 comprised of a top support 110, a base 112 and side supports 114 and 116 therebetween. Gussets 118 and 120 are provided to further resist deflection and react the hydraulic axial clamping load provided by the hydraulic ram 102. Adjustably mounted to frame 108 is a radial guide 122 including slots 124 and 126. Radial guide 122 adjusts vertically relative to frame 108 via slots 124 and 126 and is supported by fasteners 128. Fasteners 128 are received in matching height holes 130 corresponding to nesting fixture 20. Another set of holes 131 is provided for receiving fasteners 128 therein and vertically locating the guide rail corresponding to other nesting fixtures. As such, a preferred reference height 133 of the nesting fixture is established for optimally supporting axial clamp loads from hydraulic ram 102. In one embodiment, frame 108 is 12 inches (0.3 m) and reference height 133 is 8 inches (0.2 m).

Figure 6:
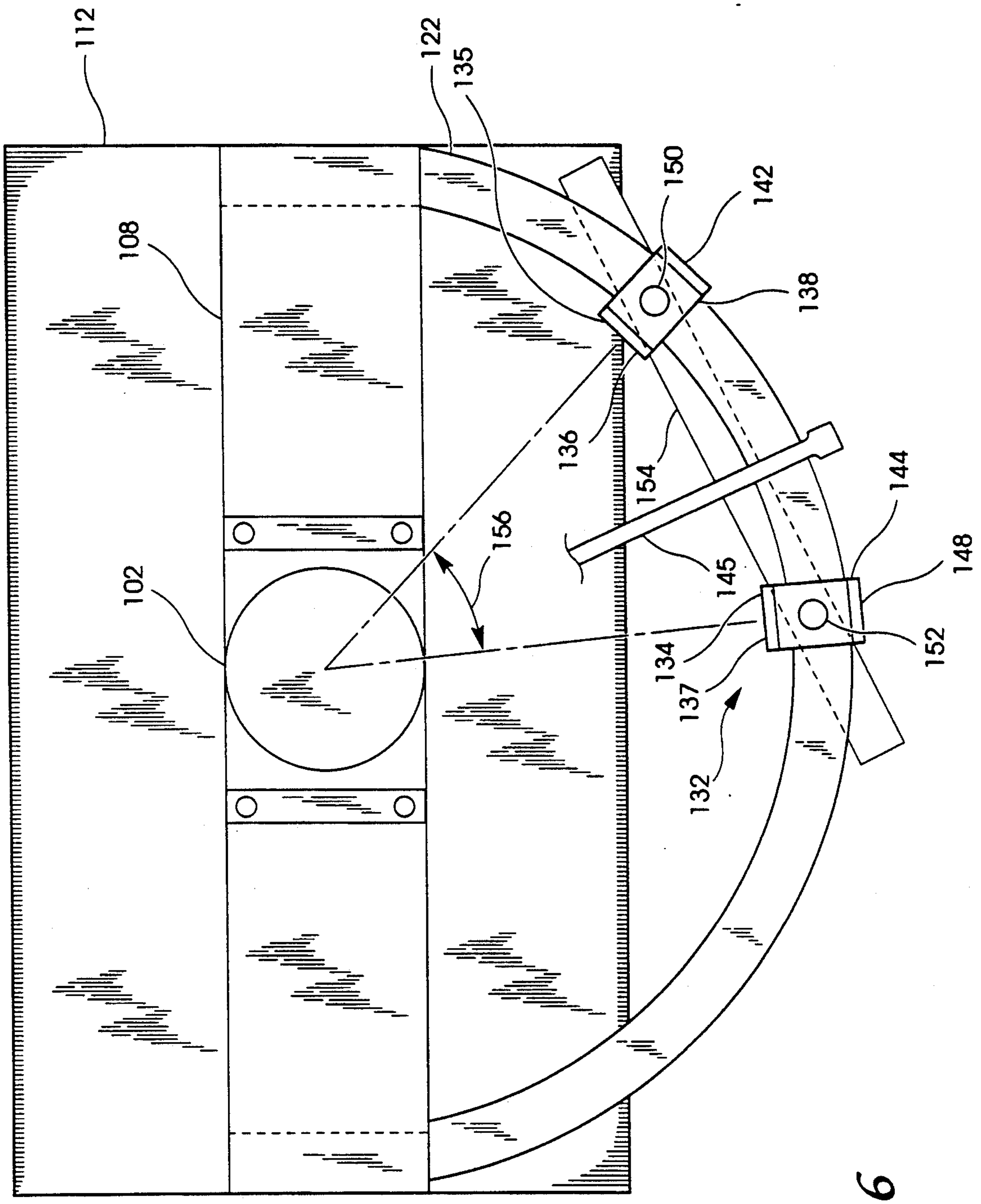
FIG. 6 is a top plan view of the torquing fixture of FIG. 5.
Figure 7:
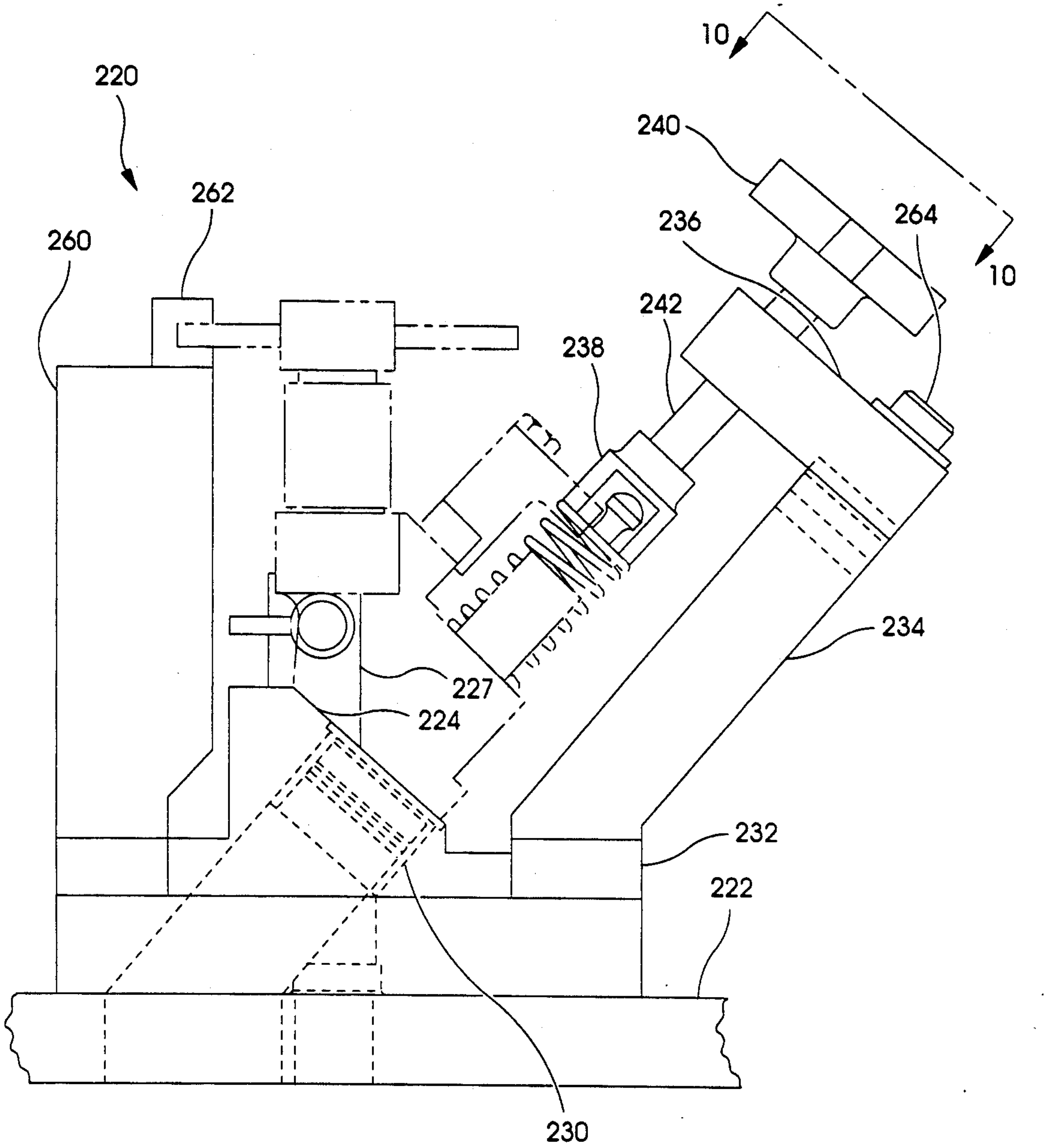
FIG. 7 is a front elevational partial cross-sectional view of a nesting fixture for a Cummins engine model L10 fuel injector assembly according to still another embodiment of the present invention.
Figure 8:
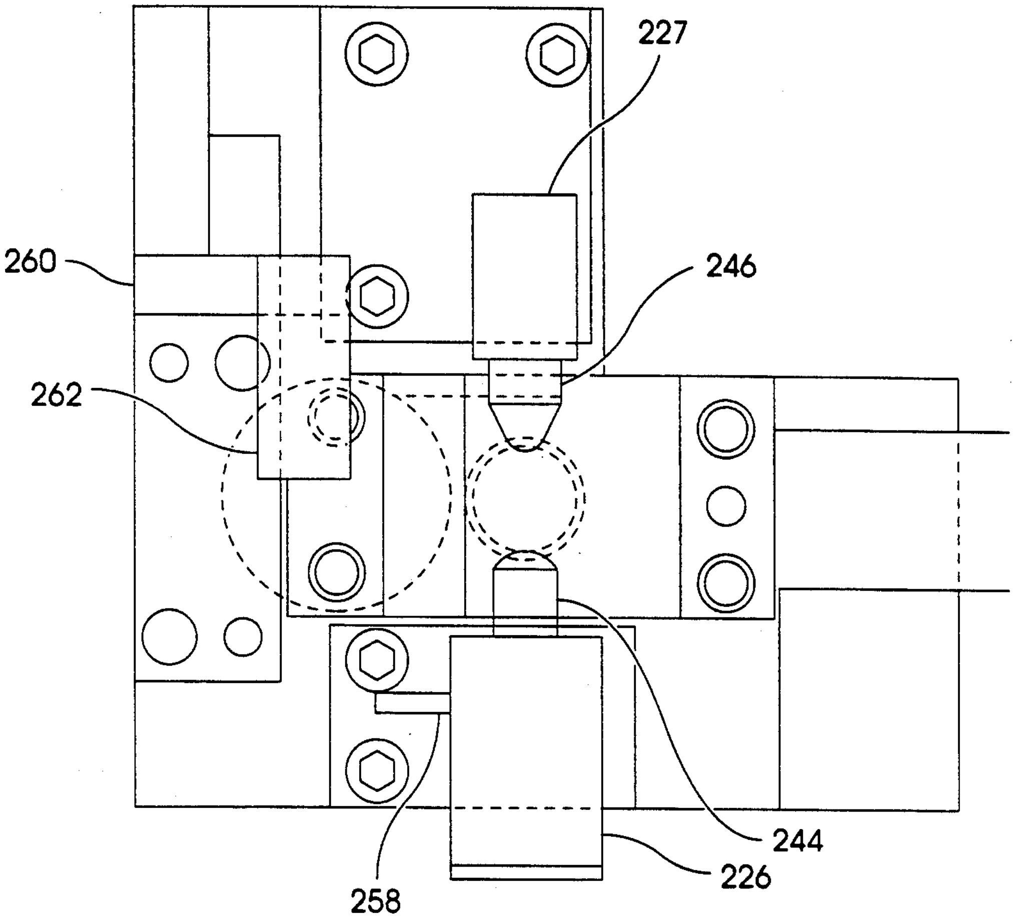
FIG. 8 is a top plan view of the nesting fixture of FIG. 7.
Figure 9:
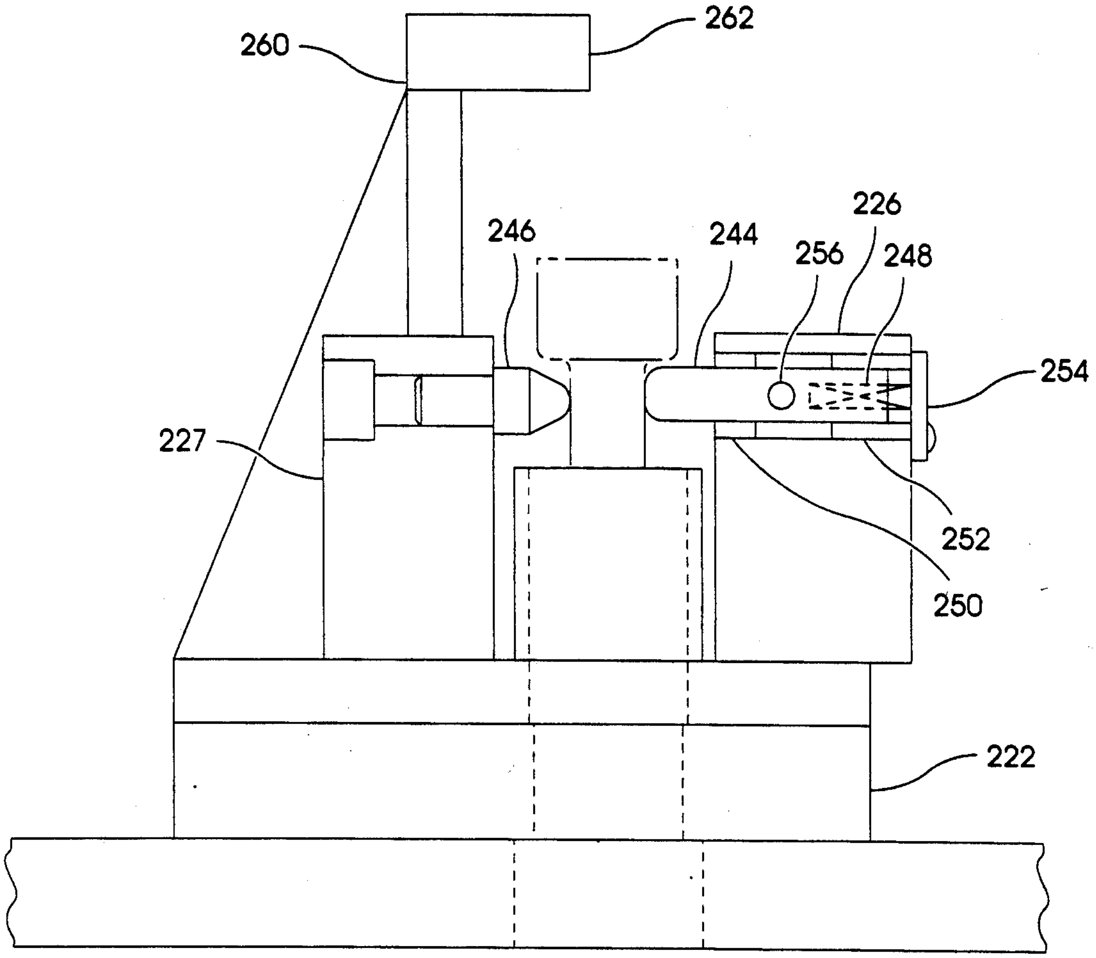
FIG. 9 is a left side elevational view of the nesting fixture of FIG. 7.
Figure 10:
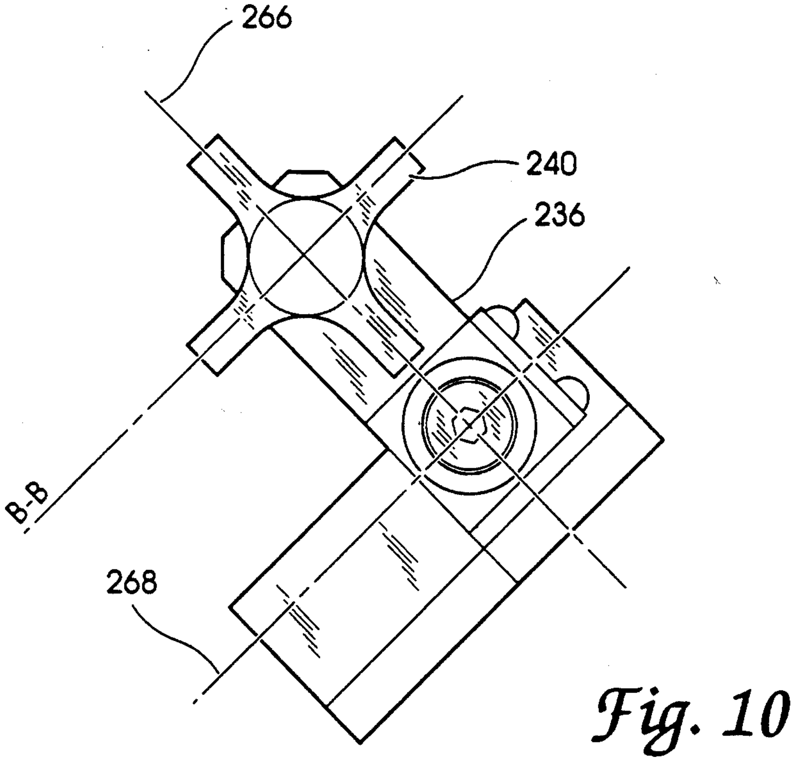
FIG. 10 is a projected view of a shoe clamp taken in the direction of the arrows 10—10 of the nesting fixture of FIG. 7.

Referring now also to FIG. 6, slidably mounted on radial guide 122 is a stop assembly 132. Stop assembly 132 includes stops 134 and 135 connected by a spacer 154. Stop 135 includes right hand stop plate 136 fastened to a top plate 138 and a bottom plate 140. A front plate 142 fastens thereto to complete the stop assembly. Similarly, left hand stop plate 137, top plate 144, bottom plate 146 and front plate 148 complete stop 134. Hand guides 150 and 152 are also provided to permit grasping of the stop assembly for easily sliding the stop assembly along radial guide 122.

Stop 134 is fixed relative to stop 135 by spacer 154. Spacer 154 provides means for maintaining stop 134 at a predetermined distance from stop 135, wherein the distance between the stops in conjunction with the radius of the guide rail combine to maintain a fixed angle of rotation 156 between the stops. A wrench adapted for torquing solenoid valve 27 is rotated between the stops to apply a predetermined torque to the solenoid valve.

Figure 13:
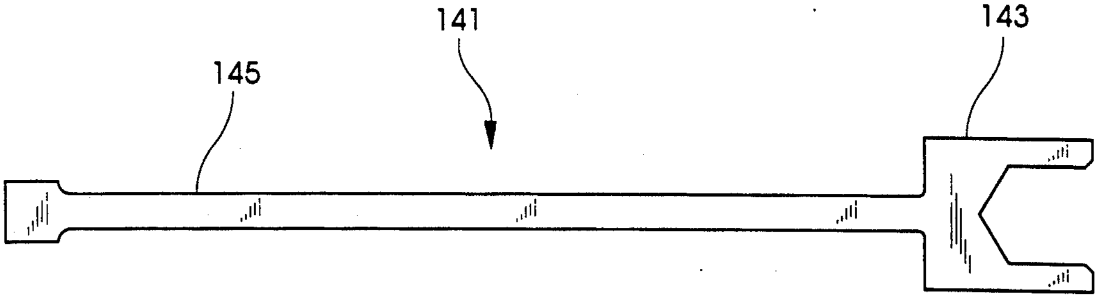
FIG. 13 is a top plan view of a torque wrench adapted to the torquing fixture of FIG. 5 and the injector assembly of FIG. 1*a*.

For example, in FIG. 13 a wrench 141 is shown having a head end 143 for engaging the solenoid valve 27 and an elongated handle 145 attached to the head end. Handle 145 extends past radial guide 122 between stops 134 and 135 when wrench 141 is installed. In one embodiment, angle 156 (FIG. 6) is set at 40 degrees for applying a predetermined torque to the solenoid valve.

Adjustable shoulder screws 158 and 160 attach spacer 154 to the stop assembly and are threadable into contact with radial guide 122. As such, tightening of shoulder screws 158 and 160 locks stop assembly 132 to radial guide 122, and loosening of shoulder screws 158 and 160 unlocks the stop assembly so that it can freely slide along radial guide 122.

Hydraulic fluid pressure is supplied to hydraulic ram 102 via lines 162 and 164. Hydraulic ram 102 includes an orifice 163 for receiving hydraulic fluid pressure to advance piston 166 therefrom and a second orifice 165 for receiving hydraulic fluid pressure to retract piston 166 therein. Hydraulic line 162 supplies pressurized hydraulic fluid to orifice 163 to advance cylindrical end 167 of piston 166 into contact with the solenoid valve. End 167 contacts a ball portion 71 (FIG. 1*a*) of the stator alignment wrench 29 to clamp the solenoid valve in the injector assembly. Included in the hydraulic circuit between hydraulic line 162 and the hydraulic ram 102 is a hydraulic pressure gauge 170. Gauge 170 is oil-filled to provide easy reading thereof and provides an indication of the hydraulic pressure supplied to the hydraulic ram. The hydraulic pressure indicated by gauge 170 is proportional to the axial force applied by the hydraulic ram to seat the solenoid valve in the injector assembly. Conversely, hydraulic line 164 supplies pressurized hydraulic fluid to orifice 165 to retract cylindrical end 167 of piston 166 out of contact with the solenoid valve.

Prior torquing techniques have required the solenoid valve to be installed within the injector assembly using a standard torque process and torquing to approximately 50 foot-pounds (67.8 Newton-meters). With the standard torque process, axial loading of the valve within the injector assembly is provided via a torque wrench. However due to frictional effects, proper orientation of the electrical terminals of the solenoid valve is difficult to maintain during the torquing process. Furthermore, in loud industrial environments a standard "click" type torque wrench is difficult to hear. To eliminate rotation of the electrical terminals of the solenoid valve during the torquing process, a hydraulic clamp load is provided. However, providing all of the clamp load with the hydraulic ram results in excessive friction between the solenoid valve and the injector body.

Torquing fixture 100 instead provides a partial clamp load via hydraulic ram 102 and a final torquing sequence which provides proper seating of the components. By providing an adjustable stop assembly, repeatable clamp loads generated by the torquing sequence are maintained. In operation, the injector assembly is placed in nesting fixture 20 and fixedly positioned therein by advancing adaptor 38 via rotation of handle 40 to clamp the injector assembly in the nesting fixture. A small amount of oil is then applied to the solenoid valve threads. The solenoid valve is hand tightened into the injector body until seated, whereupon an increase in resistance is felt. Stator alignment tool 29 (FIG. 12) is engaged with the solenoid valve, wherein tool 29 is oriented by locating slot 67 and locating holes 69 of the solenoid valve. Tool 29 is then rotated to advance the solenoid valve in the injector assembly until further rotation of tool 29 is prevented by stop 62. The nesting fixture is then located in torquing fixture 100 and the hydraulic ram advanced into contact with ball portion 71 of the wrench 29 to equally distribute loads across the solenoid valve of the injector assembly. An indicated 350 PSI (2413 kPa) of hydraulic fluid pressure on gauge 170 is required to provide an axial clamp load of approximately 1800–2000 lbs. (8006 N–8896 N).

A standard torque wrench is then employed to torque the solenoid valve to 120 inch-pounds (13.56 Newton-meters). In the case of a "click" torque wrench, the wrench should be selected to easily feel the 120 inch-pound breakover. Upon achieving the desired 120 inch-pounds of torque, the solenoid valve is then backed off by a one-quarter turn.

Wrench 141 (FIG. 13) is then located on the hex portion of the solenoid valve. Wrench 141 should be positioned on the solenoid valve without affecting the solenoid valve's orientation. With wrench 141 in place, the stop assembly is translated along the radial guide until the right hand stop contacts the handle 145 of wrench 141. Shoulder screws 158 and 160 are then tightened into contact with radial guide 122 to lock the stop assembly in place. Wrench 141 is then rotated in a clockwise direction between the stops. The torquing procedure is now complete and the hydraulic ram 102 is retracted to remove the clamp load from the solenoid valve. The nesting fixture is then removed from the torquing fixture, and the completed injector and solenoid valve assembly is removed from the nesting fixture.

Figure 11:
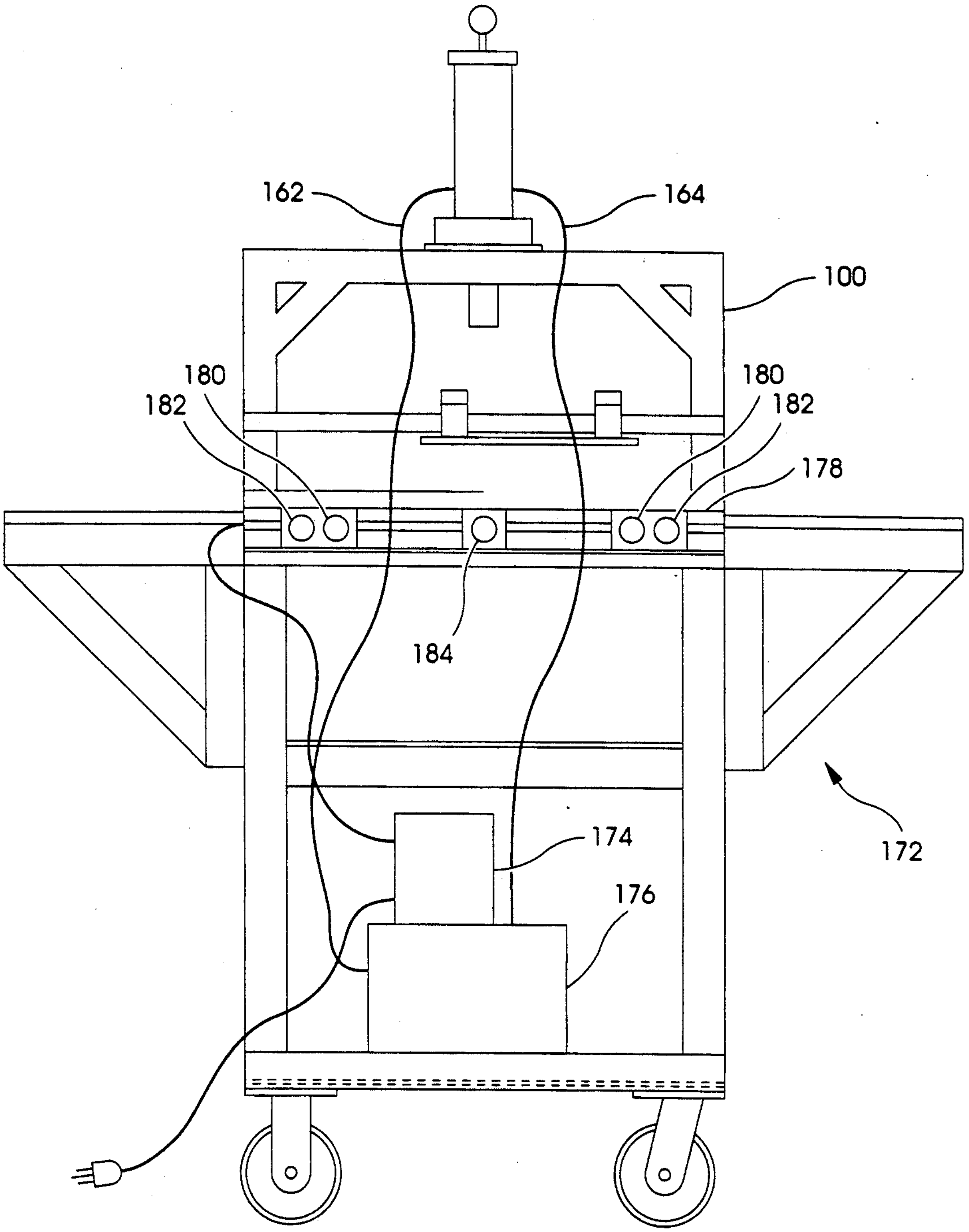
FIG. 11 is a front elevational view of the torquing fixture of FIG. 5 mounted on a portable cart according to another embodiment of the present invention.

Referring now to FIG. 11, a portable cart 172 is shown including torquing fixture 100 and an electric motor 174 received thereon. Motor 174 drives a hydraulic pump contained within hydraulic unit 176. Unit 176 also includes an associated hydraulic reservoir and valve pack for supplying pressurized hydraulic fluid through lines 162 and 164 to the hydraulic ram. A control panel 178 on the cart includes reverse switches 180 for retracting the piston within the hydraulic ram and forward switches 182 for advancing the piston from the hydraulic ram. Duplicity of the switching functions insures operator safety. A stop switch 184 stops the hydraulic ram piston. Also included is a hydraulic pressure relief valve (not shown) fluidly connected to line 162 to automatically limit the hydraulic fluid pressure below a predetermined maximum fluid pressure which can be supplied to the hydraulic ram.

Other nesting fixtures can be employed as well for locating an injector relative to torquing fixture 100. Referring now to FIG. 7 through 10, a nesting fixture 220 is shown which corresponds to nesting fixture 20. Nesting fixture 220 is adapted for receiving a Cummins engine model L10 injector assembly therein. Nesting fixture 220 includes a base 222 for removably attaching the various fixture components of nesting fixture 220 thereto. Nesting fixture 220 supports the L10 injector assembly via a center block 224 and support blocks 226 and 227. Center block 224 includes a brass liner 230. Also attached to base 222 is a swivel handle support block 232 and extension 234. The support block and extension receive a pivotable arm 236 rotatably mounted thereto. Mounted on arm 236 is a shoe clamp assembly including an adaptor 238 connected to a handle 240 by a shaft 242.

Locating pins 244 and 246 are provided for locating the injector assembly therebetween. Pin 246 is fixed within support block 227 for contacting a side of the injector assembly. Pin 244 is slidably mounted in support block 226 and outwardly biased towards pin 246 by a spring 248. Pin 244 reciprocates on bushings 250 and 252 within the support block 226. A cover 254 provides access to spring 248 and pin 244. Pin 244 includes a locating hole 256 for receiving a dowel 258 therethrough to lock the pin in place relative to support block 226.

A locator block 260 includes a stop 262 to limit the travel of a wrench handle when torquing the solenoid valve within the injector body. Arm 236 is rotatably mounted to extension 234 of support 232 by fastener 264. Arm 236 pivots from a first position defined by axis 266 to a second position defined by axis 268. When positioned along axis 266 over the injector assembly, handle 240 is rotated to advance adaptor 238 into contact with the injector assembly so as to seat and clamp the injector assembly within bushing 230 of center block 224.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A torquing fixture used for torquing a fuel injector component of a fuel injector assembly, comprising:
- a frame;
- means for locating a fuel injector assembly relative to said frame;
- a guide rail mounted to said frame;
- a stop assembly slidably mounted to said guide rail, said stop assembly including;
  - a first stop;
  - a second stop;
  - means for connecting said first stop to said second stop, said connecting means maintaining said first stop at a predetermined distance from said second stop;
- means for releasably locking said stop assembly to said guide rail; and
- a first wrench adapted for torquing the fuel injector component, said first wrench having a head end for engaging the fuel injector component and an elongated handle attached to said head end;
- wherein the head end of said first wrench engages the fuel injector component and said stop assembly slides on said guide rail to contact the handle of said first wrench at said first stop, said releasable locking means locking said stop assembly to said guide rail and said elongated handle rotating from said first stop to said second stop to apply a predetermined torque to the fuel injector component.

2. The torquing fixture of claim 1, and further comprising means attached to said frame for applying a clamp load to the fuel injector component.

3. The torquing fixture of claim 2, wherein said clamp load means includes:
- a hydraulic cylinder;
- a piston reciprocatably disposed in said hydraulic cylinder;
- hydraulic means for advancing said piston into contact with the fuel injector component and applying a clamp load thereacross; and
- hydraulic means for retracting said piston from the fuel injector assembly to release the clamp load.

4. The torquing fixture of claim 1, wherein said means for locating a fuel injector assembly relative to said frame includes a nesting fixture, said nesting fixture comprising:
- a base;
- a center block fastened to said base and including a locating bore for receiving a portion of the fuel injector assembly therein;
- a first support block fastened to said center block and including a first pin for contacting the fuel injector assembly;
- a second support block fastened to said center block across from said first support block and including a second pin for contacting the fuel injector assembly, said first and second pins locating the fuel injector assembly therebetween; and
- an extension block fastened to said base and including an arm mounted thereto, said arm including an adjustable clamp for clamping the fuel injector assembly to said center block;
- wherein the bore of said center block and said adjustable clamp fix the fuel injector assembly against movement in a direction along its longitudinal axis, and said first and second pins fix the fuel injector assembly against rotation about its longitudinal axis.

5. The torquing fixture of claim 4, wherein said nesting fixture further comprises:
- a second wrench adapted for aligning the fuel injector component relative to the fuel injector assembly, said second wrench including a head end for engaging the fuel injector component and a handle attached to said head end; and
- a locating block fastened to said base and including a third stop;
- wherein the head end of said second wrench engages the fuel injector component and the handle of said second wrench rotates to said third stop to align the fuel injector component relative to the fuel injector assembly.

6. The torquing fixture of claim 5, wherein in said nesting fixture:

said bore includes a removable bushing therein for preventing damage to the fuel injector assembly;

said second pin is reciprocatably mounted in said second support block;

said second support block includes a spring outwardly biasing said second pin towards said first pin and means for releasably locking said second pin therein; and said arm is rotatably mounted to said extension block.

7. The torquing fixture of claim 5, wherein:

said nesting fixture is sized for receiving and locating a Cummins Model L10 fuel injector assembly therein;

the head end of said first wrench is sized for engaging a solenoid valve of the Cummins Model L10 fuel injector assembly; and the head end of said second wrench is sized for engaging the solenoid valve of the Cummins Model L10 fuel injector assembly.

8. The torquing fixture of claim 5, wherein:

said nesting fixture is sized for receiving and locating a Cummins Model N14 engine fuel injector assembly therein;

the head end of said first wrench is sized for engaging a solenoid valve of the Cummins Model N14 engine fuel injector assembly; and the head end of said second wrench is sized for engaging the solenoid valve of the Cummins Model N14 engine fuel injector assembly.

9. The torquing fixture of claim 3, wherein said hydraulic means for advancing said piston and said hydraulic means for retracting said piston include:

a hydraulic motor;

said hydraulic cylinder including a first orifice for receiving hydraulic fluid pressure to advance said piston and a second orifice for receiving hydraulic fluid pressure to retract said piston;

means for fluidly coupling said hydraulic motor to said hydraulic cylinder, said fluid coupling means including first coupling means for supplying hydraulic fluid pressure from said motor to said first orifice and second coupling means for supplying hydraulic fluid pressure from said motor to said second orifice; and means for switching the supply of hydraulic fluid pressure to said hydraulic cylinder, said switching means including means for switching the supply of hydraulic fluid pressure to said first coupling means and means for switching the supply of hydraulic fluid pressure to said second coupling means.

10. The torquing fixture of claim 9, and further comprising:

a hydraulic pressure gauge fluidly coupled to said first coupling means, said hydraulic gauge indicating the fluid pressure supplied to said first orifice;

wherein said hydraulic gauge is manually read to determine the fluid pressure supplied to said first orifice and said switching means is manually switched to limit the fluid pressure supplied to said first orifice below a maximum fluid pressure.

11. The torquing fixture of claim 9, and further comprising:

a hydraulic pressure relief valve fluidly coupled to said first coupling means, said hydraulic relief valve limiting the fluid pressure supplied to said first orifice;

wherein said hydraulic relief valve is set to automatically limit the fluid pressure supplied to said first orifice below a maximum fluid pressure.

12. The torquing fixture of claim 9, and further comprising:

a portable cart;

said torquing fixture being received on said portable cart;

said hydraulic motor being received on said portable cart; and said cart including said means for switching the supply of hydraulic fluid pressure to said hydraulic cylinder.

13. A method for torquing a fuel injector component of a fuel injector assembly, comprising:

locating a fuel injector assembly relative to a torquing fixture, said torquing fixture including a guide rail mounted thereto and a stop assembly slidably mounted to said guide rail, said stop assembly including a first stop, a second stop, and means for connecting said first stop to said second stop, said connecting means maintaining said first stop at a predetermined distance from said second stop;

applying a clamp load to the fuel injector assembly;

engaging a first wrench with the fuel injector component, said first wrench having a head end for engaging the fuel injector component and an elongated handle attached to said head end;

sliding said stop assembly on said guide rail to contact said first stop with the handle of said first wrench;

locking said stop assembly to said guide rail;

rotating the elongated handle of said first wrench from said first stop to said second stop to apply predetermined torque to the fuel injector component.

14. The method of claim 13 wherein the step of locating the fuel injector assembly relative to the torquing fixture includes the steps of:

locating a portion of the fuel injector assembly in the bore of a center block fastened to a base of a nesting fixture;

locating the fuel injector assembly between a first pin of a first support block fastened to said center block and a second pin of a second support block fastened to said center block across from said first support block to fix the fuel injector assembly against rotation about its longitudinal axis;

clamping the fuel injector assembly o said center block to fix the fuel injector assembly against movement in a direction along its longitudinal axis;

locating the nesting fixture in the torquing fixture.

15. The method of claim 14 wherein the step of locating the fuel injector assembly relative to the torquing fixture includes the steps of:

engaging a second wrench with the fuel injector component, said second wrench having a head end for engaging the fuel injector component and a handle attached to said head end;

rotating the handle of said second wrench into contact with a third stop of a locating block mounted to the base of said nesting fixture to align the fuel injector component relative to the fuel injector assembly.

* * * * *